(12) United States Patent
Meng et al.

(10) Patent No.: US 11,398,016 B2
(45) Date of Patent: Jul. 26, 2022

(54) METHOD, SYSTEM, AND COMPUTER-READABLE MEDIUM FOR IMPROVING QUALITY OF LOW-LIGHT IMAGES

(71) Applicant: GUANGDONG OPPO MOBILE TELECOMMUNICATIONS CORP., LTD., Guangdong (CN)

(72) Inventors: Zibo Meng, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/188,872

(22) Filed: Mar. 1, 2021

(65) Prior Publication Data
US 2021/0183030 A1 Jun. 17, 2021

Related U.S. Application Data

(63) Continuation of application No. PCT/CN2019/102881, filed on Aug. 27, 2019.
(Continued)

(51) Int. Cl.
*G06T 5/00* (2006.01)
(52) U.S. Cl.
CPC .............. *G06T 5/007* (2013.01); *G06T 5/002* (2013.01); *G06T 2207/20084* (2013.01)

(58) Field of Classification Search
CPC ... G06T 5/007–009; G06T 2207/20208; G06T 2207/20084; G06T 2207/20081;
(Continued)

(56) References Cited

U.S. PATENT DOCUMENTS

2018/0089505 A1 3/2018 El-Khamy et al.
2018/0241929 A1* 8/2018 Bouzaraa ............... G06K 9/627
(Continued)

FOREIGN PATENT DOCUMENTS

CN 108010031 5/2018
CN 108062754 5/2018
WO 2015079712 6/2015

OTHER PUBLICATIONS

Chen, Qifeng, Jia Xu, and Vladlen Koltun. "Fast Image Processing with Fully-Convolutional Networks." arXiv preprint arXiv: 1709.00643v1 (2017). (Year: 2017).*
(Continued)

*Primary Examiner* — Geoffrey E Summers
(74) *Attorney, Agent, or Firm* — Hodgson Russ LLP

(57) ABSTRACT

In an embodiment, a method includes receiving a low-light digital image; generating, by at least one processor, a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and outputting, by the at least one processor, the resulting digital image to an output device.

20 Claims, 4 Drawing Sheets

Related U.S. Application Data

(60) Provisional application No. 62/728,010, filed on Sep. 6, 2018.

(58) Field of Classification Search
CPC .... G06T 5/001; G06T 5/002; G06N 3/02–088
See application file for complete search history.

(56) References Cited

U.S. PATENT DOCUMENTS

| | | | |
|---|---|---|---|
| 2019/0043178 A1* | 2/2019 | Chen | G06T 5/009 |
| 2019/0096038 A1* | 3/2019 | El-Khamy | G06T 5/002 |
| 2019/0130545 A1* | 5/2019 | Cardei | G06V 10/60 |
| 2021/0035304 A1* | 2/2021 | Jie | G06K 9/627 |

OTHER PUBLICATIONS

Yu, Fisher, and Vladlen Koltun. "Multi-scale context aggregation by dilated convolutions." arXiv preprint arXiv:1511.07122v3 (2015). (Year: 2016).*

Chen, Chen, et al. "Learning to See in the Dark." arXiv preprint arXiv: 1805.01934v4 (2018). (Year: 2018).*

Eilertsen, Gabriel, et al. "HDR image reconstruction from a single exposure using deep CNNs." ACM transactions on graphics (TOG) 36.6 (2017): 1-15. (Year: 2017).*

Fan, Zunlin, et al. "Low-level structure feature extraction for image processing via stacked sparse denoising autoencoder." Neurocomputing 243 (2017): 12-20. (Year: 2017).*

Lore, Kin Gwn, Adedotun Akintayo, and Soumik Sarkar. "LLNet: A deep autoencoder approach to natural low-light image enhancement." Pattern Recognition 61 (2017): 650-662. (Year: 2017).*

Park, Seonhee, et al. "Dual autoencoder network for retinex-based low-light image enhancement." IEEE Access 6 (2018): 22084-22093. (Year: 2018).*

Remez, Tai, et al. "Deep convolutional denoising of low-light images." arXiv preprint arXiv:1701.01687v1 (2017). (Year: 2017).*

Ronneberger, Olaf, Philipp Fischer, and Thomas Brox. "U-net: Convolutional networks for biomedical image segmentation." International Conference on Medical image computing and computer-assisted intervention. Springer, Cham, 2015. (Year: 2015).*

Tao, Li, et al. "LLCNN: A convolutional neural network for low-light image enhancement." 2017 IEEE Visual Communications and Image Processing (VCIP). IEEE, 2017. (Year: 2017).*

Wang, Tianyang, Mingxuan Sun, and Kaoning Hu. "Dilated deep residual network for image denoising." 2017 IEEE 29th international conference on tools with artificial intelligence (ICTAI). IEEE, 2017. (Year: 2017).*

Rudin et al, "Nonlinear total variation based noise removal algorithms," Physica D: Nonlinear Phenomena, Nov. 1992, vol. 60, Nos. 104, pp. 259-268.

Portilla et al., "Image denoising using scale mixtures of Gaussians in the wavelet domain," IEEE Transactions on Image Processing, Nov. 2003, vol. 12, No. 11, pp. 1338-1351.

Mairal et al., "Non-local sparse models for image restoration," IEEE 12th International Conference on Computer Vision (ICCV), 2009, pp. 2272-2279.

Gu et al., "Weighted nuclear norm minimization with application to image denoising," IEEE Conference on Computer Vision and Pattern Recognition, 2014, 8 pages.

Dabov et al., "Image denoising by sparse 3D transform-domain collaborative filtering," IEEE Transactions on Image Processing, Aug. 2007, vol. 16, No. 8, 16 pages.

Jain et al., "Natural image denoising with convolutional networks," Advances in Neural Information Processing Systems 21 (NIPS), 2008, 8 pages.

Zhang et al., "Beyond a Gaussian denoiser: Residual learning of deep CNN for image denoising" IEEE Transactions an Image Processing, 2017, vol. 26, No. 7, 13 pages.

Hasinoff et al. "Burst photography for high dynamic range and low-light imaging on mobile cameras," ACM Transactions on Graphics, 2016, vol. 35, No. 6, 13 pages.

Liu et al., "Fast burst images denoising," ACM Transactions on Graphics, 2014, vol. 33, No. 6, 9 pages.

Dong et al., "Fast efficient algorithm for enhancement of low lighting video,". IEEE International Conference on Multimedia and Expo, 2011, 6 pages.

Malm et al., "Adaptive enhancement and noise reduction in very low light-level video,". IEEE 11th International Conference on Computer Vision, 2007, 8 pages.

Loza et al., "Automatic contrast enhancement of low-light images based on local statistics of wavelet coefficients," IEEE International Conference on Image Processing, 2010, 9 pages.

Park et al., "Low-light image enhancement using variational optimization-based Retinex model," IEEE Transactions an Consumer Electronics, May 2017, vol. 63, No. 2, pp. 178-184.

Guo et al., "LIME: Low-light image enhancement via illumination map estimation," IEEE Transactions on Image Processing, 2017, vol. 26, No. 2, 12 pages.

Chen et al., "Learning to See in the Dark," Conference on Computer Vision and Pattern Recognition (CVPR), 2018, 10 pages.

Wang et al., "Multi-Scale structural similarity for image quality assessment," Proceedings of the 37th IEEE Asilomar Conference on Signals, Systems and Computers, 2004, 5 pages.

Yu et al., "Multi-Scale Context Aggregation by Dilated Convolutions," ICLR, 2016, 13 pages.

WIPO, English translation of the ISR and WO for PCT/CN2019/102881, Nov. 27, 2019.

* cited by examiner

METHOD, SYSTEM, AND COMPUTER-READABLE MEDIUM FOR IMPROVING QUALITY OF LOW-LIGHT IMAGES

CROSS-REFERENCE TO RELATED APPLICATIONS

This application is a continuation of International Application No. PCT/CN2019/102881, filed on Aug. 27, 2019, which claims priority to U.S. Provisional Application No. 62/728,010, filed on Sep. 6, 2018. The entire disclosures of the above-identified applications are incorporated by reference herein.

BACKGROUND OF THE DISCLOSURE

1. Field of Disclosure

The present disclosure relates to the field of image processing, and more particularly, to a method, system, and computer-readable medium for improving quality of low-light images.

2. Description of the Related Art

Taking photos having good perceptual quality under low light conditions is extremely challenging due to a low signal-to-noise ratio (SNR). Extending exposure time can acquire visually good images; however, this can easily introduce motion blur, and it is not always applicable in real life.

To make the low-light images with short exposure time visually plausible, extensive study has been conducted including denoising techniques which aim at removing noises in the images due to the low light condition, and enhancement techniques which are developed for improving the perceptual quality of digital images.

However, current denoising approaches are generally evaluated using synthetic data, which are not generalized well to real images, and low-light enhancement approaches do not take the noise into consideration.

SUMMARY

An object of the present disclosure is to propose a method, system, and computer-readable medium for improving quality of low-light images.

In a first aspect of the present disclosure, a method includes:
receiving a low-light digital image;
generating, by at least one processor, a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and
outputting, by the at least one processor, the resulting digital image to an output device.

According to an embodiment in conjunction with the first aspect of the present disclosure, before the receiving the low-light digital image, the method further comprises:
receiving a digital image;
determining whether at least one of a contrast value, a dynamic range, and a signal-to-noise ratio (SNR) of the digital image is lower than a threshold; and
determining that the digital image is the low-light digital image in response to determine that at least one of the contrast value, the dynamic range, and the SNR is lower than the threshold.

According to an embodiment in conjunction with the first aspect of the present disclosure, the encoder-decoder neural network comprises a U-net architecture.

According to an embodiment in conjunction with the first aspect of the present disclosure, the generating the resulting digital image comprises:
performing a pooling operation after every few convolutional layers at the downsampling stage; and
performing an upscaling operation before every few convolutional layers at the upscaling stage.

According to an embodiment in conjunction with the first aspect of the present disclosure, the generating the resulting digital image comprises:
concatenating the convolutional layers of the downsampling stage and the convolutional layers of the upscaling stage having a same resolution with the convolutional layers of the downsampling stage.

According to an embodiment in conjunction with the first aspect of the present disclosure, the generating the resulting digital image comprises:
extracting, by a global pooling layer of the multi-scale context aggregating block, global context information of the low-light digital image; and
extracting, by a plurality of dilation layers with various dilation rates of the multi-scale context aggregation block, context information of the low-light digital image at different scales.

According to an embodiment in conjunction with the first aspect of the present disclosure, the global pooling layer and one of the dilation layers are concatenated, and the other dilation layers are concatenated in a cascading fashion with respect to corresponding scales.

According to an embodiment in conjunction with the first aspect of the present disclosure, the generating the resulting digital image further comprises:
performing a bilinear upscaling operation to the global pooling layer.

According to an embodiment in conjunction with the first aspect of the present disclosure, the multi-scale context aggregating block comprises:
a full-connected layer connected after the global pooling layer and the dilation layers.

According to an embodiment in conjunction with the first aspect of the present disclosure, the outputting the resulting digital image comprises:
outputting the resulting digital image to a display device to display the resulting digital image on the display device.

In a second aspect of the present disclosure, a system includes at least one memory configured to store program instructions; at least one processor configured to execute the program instructions, which cause the at least one processor to perform steps comprising: receiving a low-light digital image;
generating a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and outputting the resulting digital image to an output device.

According to an embodiment in conjunction with the second aspect of the present disclosure, before the receiving the low-light digital image, the method further comprises:

receiving a digital image;

determining whether at least one of a contrast value, a dynamic range, and a signal-to-noise ratio (SNR) of the digital image is lower than a threshold; and determining that the digital image is the low-light digital image in response to determine that at least one of the contrast value, the dynamic range, and the SNR is lower than the threshold.

According to an embodiment in conjunction with the second aspect of the present disclosure, the encoder-decoder neural network comprises a U-net architecture; and the generating the resulting digital image comprises:

performing a pooling operation after every few convolutional layers at the downsampling stage;

performing an upscaling operation before every few convolutional layers at the upscaling stage; and concatenating the convolutional layers of the downsampling stage and the convolutional layers of the upscaling stage having a same resolution with the convolutional layers of the downsampling stage.

According to an embodiment in conjunction with the second aspect of the present disclosure, the generating the resulting digital image comprises:

extracting, by a global pooling layer of the multi-scale context aggregating block, global context information of the low-light digital image;

extracting, by a plurality of dilation layers with various dilation rates of the multi-scale context aggregation block, context information of the low-light digital image at different scales; and wherein the global pooling layer and one of the dilation layers are concatenated, and the other dilation layers are concatenated in a cascading fashion with respect to corresponding scales, and a full-connected layer of the multi-scale context aggregating block is connected after the global pooling layer and the dilation layers.

According to an embodiment in conjunction with the second aspect of the present disclosure, the generating the resulting digital image further comprises:

performing a bilinear upscaling operation to the global pooling layer.

In a third aspect of the present disclosure, a non-transitory computer-readable medium with program instructions stored thereon, that when executed by at least one processor, cause the at least one processor to perform steps comprising:

receiving a low-light digital image;

generating a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and outputting the resulting digital image to an output device.

According to an embodiment in conjunction with the third aspect of the present disclosure, before the receiving the low-light digital image, the method further comprises:

receiving a digital image;

determining whether at least one of a contrast value, a dynamic range, and a signal-to-noise ratio (SNR) of the digital image is lower than a threshold; and determining that the digital image is the low-light digital image in response to determine that at least one of the contrast value, the dynamic range, and the SNR is lower than the threshold.

According to an embodiment in conjunction with the third aspect of the present disclosure, the encoder-decoder neural network comprises a U-net architecture; and the generating the resulting digital image comprises:

performing a pooling operation after every few convolutional layers at the downsampling stage;

performing an upscaling operation before every few convolutional layers at the upscaling stage; and concatenating the convolutional layers of the downsampling stage and the convolutional layers of the upscaling stage having a same resolution with the convolutional layers of the downsampling stage.

According to an embodiment in conjunction with the third aspect of the present disclosure, the generating the resulting digital image comprises:

extracting, by a global pooling layer of the multi-scale context aggregating block, global context information of the low-light digital image;

extracting, by a plurality of dilation layers with various dilation rates of the multi-scale context aggregation block, context information of the low-light digital image at different scales; and wherein the global pooling layer and one of the dilation layers are concatenated, and the other dilation layers are concatenated in a cascading fashion with respect to corresponding scales, and a full-connected layer of the multi-scale context aggregating block is connected after the global pooling layer and the dilation layers.

According to an embodiment in conjunction with the third aspect of the present disclosure, the generating the resulting digital image further comprises:

performing a bilinear upscaling operation to the global pooling layer.

In the present disclosure, the low-light digital image is processed using the encoder-decoder neural network. The network includes the convolutional layers classified into the downsampling stage and the upscaling stage, and the multi-scale context aggregating block configured to aggregate multi-scale context information of the low-light digital image and employed between the downsampling stage and the upscaling stage. In comparison to existing arts, the present disclosure takes local and global context/color information of the low-light digital image into consideration. Accordingly, the noise can be exhaustively removed and the image can be greatly enhanced for better representation with fruitful details and vivid colors.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF PREFERRED EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

Figure 1:
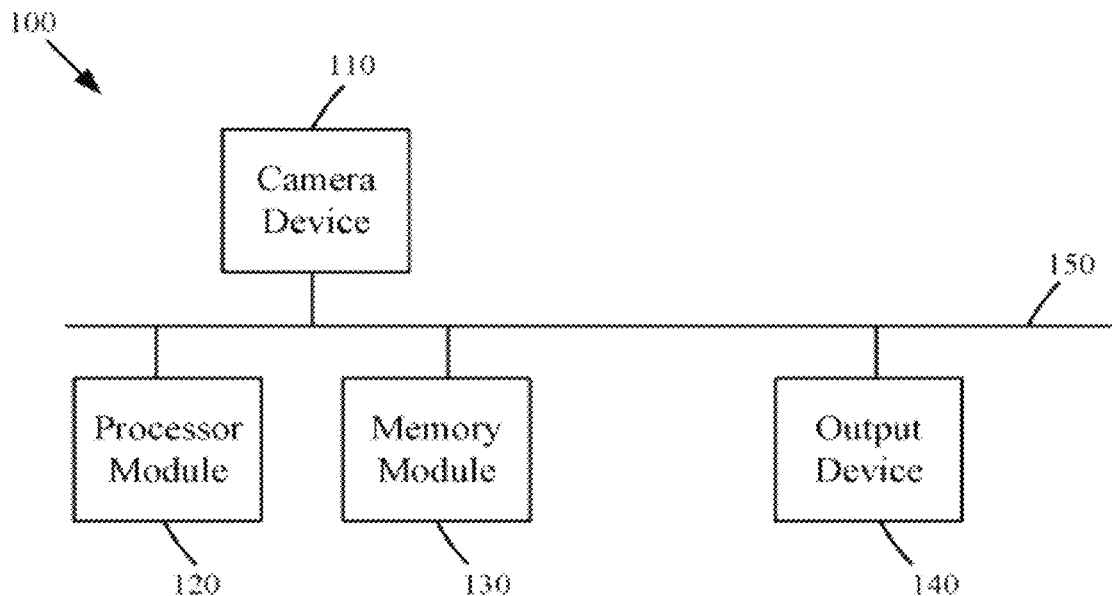
FIG. 1 is a diagram illustrating a terminal in accordance with an embodiment of the present disclosure.

FIG. 1 is a diagram illustrating a terminal 100 in accordance with an embodiment of the present disclosure. Referring to FIG. 1, the terminal 100 includes a camera device 110, a processor module 120, a memory module 130, an output device 140, and a bus 150 connecting to these modules and devices. The terminal 100 has an ability to perform low-light image denoising and enhancement. The terminal 100 can convert low-light images into images with good perceptual quality. The terminal 100 may be implemented by cell phones, smartphones, tablets, notebook computers, desktop computers, or any electronic device having enough computing power to perform the image processing.\

The camera device 110 is configured to capture digital images. When the digital images are captured under low illumination conditions or with an insufficient amount of exposure time, it may be hard to identify the content of the captured digital images. These digital images may have low signal-to-noise ratio (SNR) and are classified as the low-light images. The camera device 110 may be implemented by an RGB camera or a CMYK camera. The camera device 110 is optionally included in the terminal 100. The terminal 100 may perform the image processing to the images with low SNR retrieved from the camera device 110 included in the terminal 100 or any image capturing apparatus outside the terminal 100, or an internal or external storage, or obtained via wired or wireless communication.

The memory module 130 may be a transitory or non-transitory computer-readable medium that includes a plurality of memory storing program instructions executable by the processor module 120. The processor module 120 includes at least one processor that send signals directly or indirectly to and/or receives signals directly or indirectly from the camera device 110, the memory module 130, and the output device 140 via the bus 150. The processor module 120 is configured to process the digital images (i.e., captured by the camera device 110) with low SNR, by means of a neural network model corresponding to parts of the memory storing program instructions, to generate images with reduced noises and enhanced quality. The neural network model is a key to achieve image denoising and image enhancement in a single process, and will be further described later.

The images generated by the processor module 120 using the neural network model are outputted by the processor module 120 to the output device 140. The output device 140 may be a storage, a display device, or a wired or wireless communication module for receiving outputted image data from the processor module 120. That is, resulting images with noises reduced and quality enhanced by means of the neural network model may be stored in the storage, displayed on the display device, or transmitted to an external apparatus outside the terminal 10 using an external wired or wireless communication module.

Figure 2:
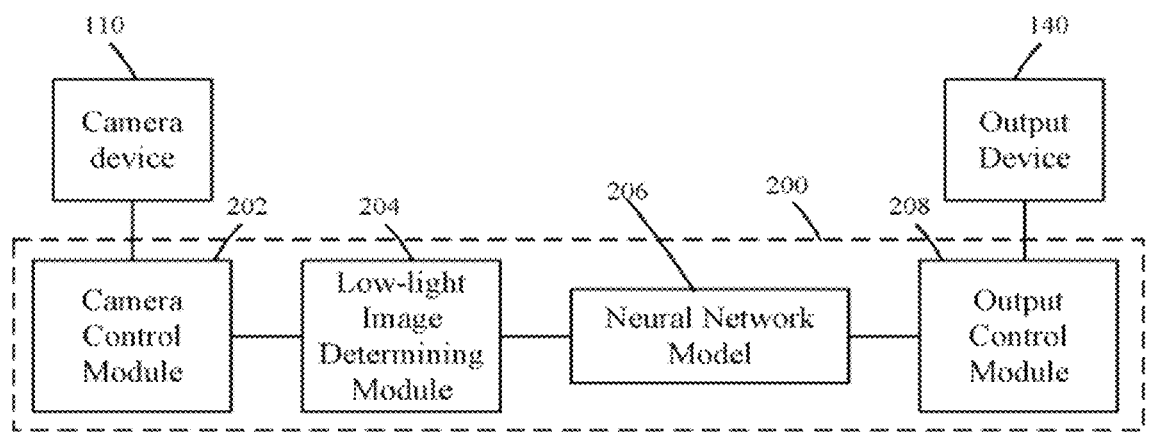
FIG. 2 is a block diagram illustrating software modules and associated hardware of the terminal in accordance with an embodiment of the present disclosure.

FIG. 2 is a block diagram illustrating software modules 200 and associated hardware of the terminal 100 in accordance with an embodiment of the present disclosure. The terminal 100 includes the software modules 200 stored in the memory module 130 and executable by the processor module 120. The software modules 200 include a camera control module 202, a low-light image determining module 204, a neural network model 206, and an output control module 208. The camera control module 202 is configured to cause the camera device 110 to take photos to generate a digital image. The low-light image determining module 204 is configured to determine whether the digital image captured by the camera device 110 is a low-light digital image. For example, a contrast value, a dynamic range, and an SNR of the digital image may be used to determine whether it is the low-light digital image. If the contrast value is too low, the dynamic range is too narrow, or the SNR is too small, the digital image is likely to be determined as the low-light digital image. If any one or any combination of the contrast value, the dynamic range, and the SNR is lower than a threshold, the low-light image determining module 204 may classify the captured digital image as the low-light digital image. The low-light digital image is then fed into the neural network model 206 for denoising and enhancement. A resulting digital image is outputted to the output control module 208. The output control module 208 controls transmission of the resulting digital image and decides which device the resulting digital image is to be outputted to, according to a user selection or default settings. The output control module 208 outputs the resulting digital image to the output device 140 such as a display device, a storage, and a wired or wireless communication device.

Figure 3:
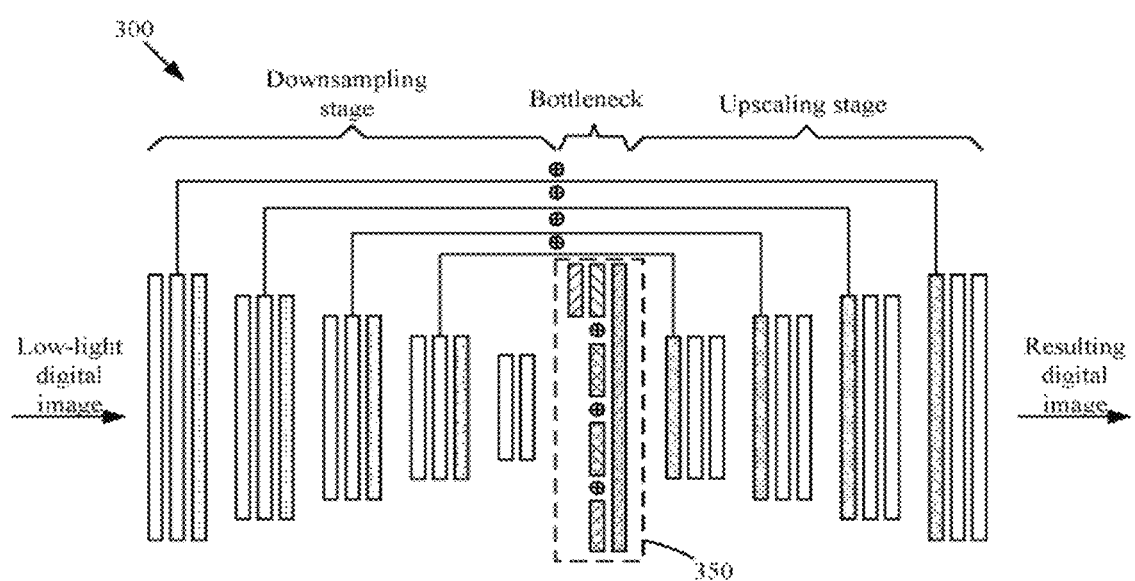
FIG. 3 is a graphical depiction illustrating the neural network model in accordance with an embodiment of the present disclosure.

FIG. 3 is a graphical depiction illustrating the neural network model 206 in accordance with an embodiment of the present disclosure. The neural network model 206 includes an encoder-decoder neural network 300, as shown in FIG. 3. The low-light digital image is inputted at a left side of the encoder-decoder neural network 300 and the resulting digital image is outputted at a right side of the encoder-decoder neural network 300. Given the low-light digital image, I, the encoder-decoder neural network 300 is employed to learn a mapping, $I'=f(I;w)$, to generate the resulting digital image I' in an end-to-end fashion, where w is a set of learnable parameters of the encoder-decoder neural network 300. Learned parameters and the encoder-decoder neural network 300 are applied to the terminal 100 for image deposing and enhancing. An image taken in a low-light condition with a short exposure is visually unfriendly since it is extremely dark and noisy, where the color and details are invisible to users. By applying the encoder-decoder neural network 300 and the learned parameters, the image can be enhanced and the noise can be exhaustively removed for better representation on the terminal 100 with fruitful details and vivid colors.

Figure 4:
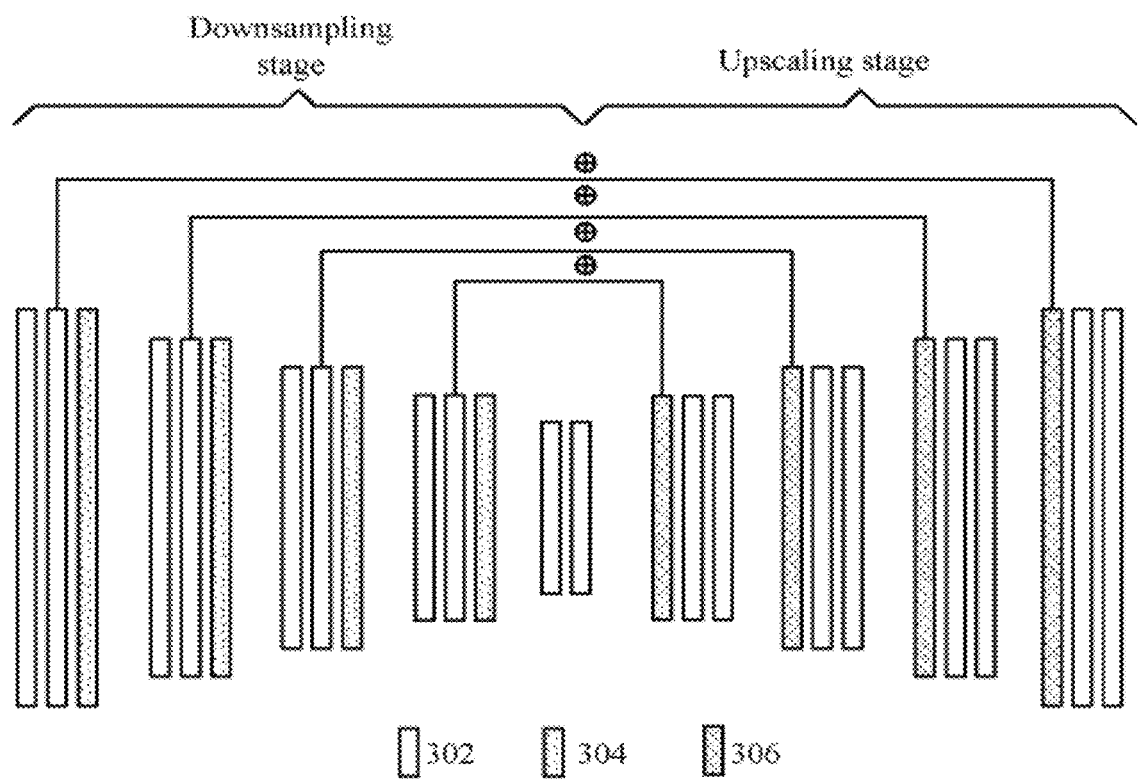
FIG. 4 is a graphical depiction showing the U-net architecture of the encoder-decoder neural network depicted in FIG. 3.
Figure 5:
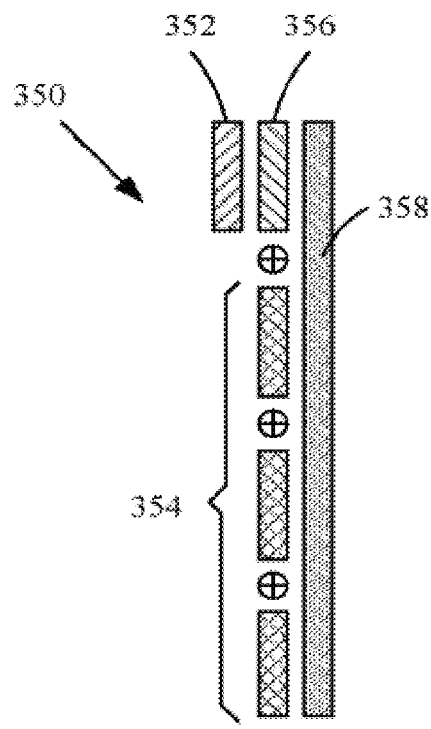
FIG. 5 is a graphic depiction showing the multi-scale context aggregating block depicted in FIG. 3.

The pipeline of the encoder-decoder neural network 300 is depicted in FIG. 3. The framework of the encoder-decoder neural network 300 can be divided into two parts, that is, a U-net architecture and a multi-scale context aggregating block 350. FIG. 4 is a graphical depiction showing the U-net architecture of the encoder-decoder neural network 300 depicted in FIG. 3. FIG. 5 is a graphical depiction showing the multi-scale context aggregating block 350 depicted in FIG. 3. The U-net architecture includes a downsampling stage and an upscaling stage, and the multi-scale context aggregating block 350 is employed at a bottleneck between the downsampling stage and the upscaling stage.

(1) The U-net architecture

Referring to FIGS. 3 and 4, the U-net architecture includes a plurality of convolutional layers 302 at the downsampling stage and at the upscaling stage. The convolutional layers 302 may be directed to multi-channel feature maps for performing convolutional operations. In an example, each convolutional layer 302 may represent a 3×3 convolutional operation and a Leaky ReLU operation. In an example, the U-net architecture may include 18 convolutional layers in total. The resolution gradually decreases and the number of the channels gradually increases for the convolutional layers at the downsampling stage. The resolution gradually increases and the number of the channels gradually decreases for the convolutional layers at the upscaling stage. The low-light digital image firstly goes through downsampling operations to extract abstract features, as well as to reduce the spatial resolution. After the bottleneck, the feature map will go through upscaling operations.

At the downsampling stage, a pooling layer (e.g., a max pooling layer) 304 is deployed after several convolutional layers 302. For example, the pooling layer 304 is disposed after every two convolutional layers 302. After every few convolutional layers 302, a pooling operation (e.g., a max pooling operation) is performed at the downsampling stage. The pooling operation reduces the resolution of a corresponding feature map. At the upscaling stage, an upscaling layer 306 is deployed before several convolutional layers 302. For example, the upscaling layer 306 is disposed before every two convolutional layers 302. Before every few convolutional layers 302, an upscaling operation is performed at the upscaling stage. The upscaling operation increases the resolution of a corresponding feature map.

Further, the convolutional layers 302 of the downsampling stage and the convolutional layers 302 of the upscaling stage having a (substantially) same resolution (or at substantially same downsampling and upscaling level) with the convolutional layers 302 of the downsampling stage are concatenated. To be described more clearly, the upscaling layer 306 may be formed by combining a previous feature map next to the upscaling layer 306 and a feature map at the downsampling stage at a same level as the upscaling layer 306, by means of copy and crop operations as needed. The concatenation operation is indicated by a symbol ⊕ as depicted in FIG. 4. This operation can effectively preserve the details in an image.

The U-net architecture is described in more detail by O. Ronneberger, P. Fischer, and T. Brox. U-net: Convolutional networks for biomedical image segmentation. In MICCAI, 2015. 4, 5, 7, proposed to segment biomedical images.

However, the resulting image obtained by only using this U-net architecture to process the low-light digital image may have inconsistent colors at different locations since global context/color information are not taken into consideration. As described below, the present disclosure introduces the global context/color information into the encoder-decoder neural network 300.

(2) The multi-scale context aggregating block

Referring to FIGS. 3 and 5, the multi-scale context aggregating block 350 is deployed at the bottleneck between the downsampling stage and the upscaling stage of the encoder-decoder neural network 300. The multi-scale context aggregating block 350 includes a global pooling layer 352 configured to extract global context/color information of the low-light digital image. The global pooling layer 352 may be obtained by means of a pooling operation performed to a previous convolutional layer 302 next to the global pooling layer 352. The multi-scale context aggregating block 350 also includes a plurality of dilation layers 354 with various dilation rates configured to extract local context/color information of the low-light digital image at different scales. That is, a set of dilated convolutional operations with various dilation rates are employed to extract the local context/color information at different scales. Each dilation layer 354 may be obtained by means of dilation operation performed to a previous convolutional layer 302 next to a corresponding dilation layer 354. For example, a 2-dilated convolutional operation is performed to a previous feature map to obtain one dilation layer and a 4-dilated convolutional operation is performed to the same to obtain another dilation layer. Dilation operation is an operation to grow the number of parameters for a feature map, and is a known operation in the art.

Multi-scale context aggregation is described in more detail by F. Yu, V. Koltun, "Multi-scale context aggregation by dilated convolutions", Proc. Int. Conf. Learn. Representations, 2016, used in image segmentation.

As depicted in FIG. 5, the global pooling layer 352 and the dilation layers 354 are concatenated. In more details, the global pooling layer 352 and one of the dilation layers 354 (a dilation layer 356 shown in FIG. 5) are concatenated, and the other dilation layers 354 are concatenated in a cascading fashion with respect to corresponding scales. For example, the global pooling layer 352 and a first dilation layer obtained using a 2-dilated convolutional operation are concatenated, the first dilation layer and a second dilation layer obtained using a 4-dilated convolutional operation are concatenated, the second dilation layer and a third dilation layer obtained using a 8-dilated convolutional operation are concatenated, the third dilation layer and a fourth dilation layer obtained using a 16-dilated convolutional operation are concatenated, and so on.

The multi-scale context aggregating block 350 further includes a full-connected layer (or a 1×1 convolutional layer) 358 connected after the global pooling layer 352 and the dilation layers 354. In more details, the global pooling layer 352 and the dilation layers 354 are concatenated channel-wisely followed by the full-connected layer to generate a final representation containing multi-scale information of the low-light digital image.

The inputted low-light digital image may have arbitrary size or resolution, which means that the feature map in the bottleneck has arbitrary size. If a deconvolutional layer is applied after the global pooling layer 352, the size of kernel in the deconvolutional layer will be dynamic which is almost uncontrollable and not what we want to see. Thus, instead of using the deconvolutional layer, an upscaling operation (preferably, a bilinear upscaling operation) is employed to rescale the feature map back to the same size of the input feature map to perform the concatenation between the global pooling layer 352 and the dilation layers 354 and the following convolutional operations. In more details, the size of the feature map in the global pooling layer 352 is reduced with respect to the feature map in a previous layer. The upscaling operation can rescale the feature map in the global pooling layer 352 to have a size as the same as the feature map in the previous layer.

Since local and global context/color information is taken into consideration in the present disclosure in low-light image denoising and enhancement, the noise can be exhaustively removed and the image can be greatly enhanced in an end-to-end fashion, leading to better representation with fruitful details and vivid colors.

Cost Functions

During the training process, the low-light digital images are fed into the network 300 as input, and a loss function is calculated between the system output and the corresponding long-exposure images. Loss function is a weighted joint loss of $\ell_1$ and multi-scale structured similarity index (MS-SSIM), which is defined as follows:

$$\mathcal{L} = \lambda \mathcal{L}^{\ell_1} + (1-\lambda) \mathcal{L}^{MS\text{-}SSIM}$$

where $\lambda$ is set to 0.16 empirically; $\mathcal{L}^{\ell_1}$ is the $\ell_1$ loss defined by the following equation:

$$\mathcal{L}^{\ell_1} = \frac{1}{N} \sum_{i \in I} |I(i) - \hat{I}(i)|$$

where $\hat{I}$ and $I$ are the output image and the ground-truth image, respectively; N is the total number of pixels in the input image.

$\mathcal{L}^{MS\text{-}SSIM}$ represents MS-SSIM loss given by the equation below:

$$\mathcal{L}^{MS\text{-}SSIM} = 1 - MS\text{-}SSIM$$

For pixel i, the MS-SSIM is defined as:

$$MS\text{-}SSIM(i) = l_M^\alpha(i) \cdot \prod_{j=1}^{M} cs_j^{\beta_j}(i)$$

$$l(i) = \frac{2\mu_x \mu_y + C_1}{\mu_x^2 + \mu_y^2 + C_1}$$

$$cs(i) = \frac{2\sigma_{xy} + C_2}{\sigma_x^2 + \sigma_y^2 + C_2}$$

Where (x, y) represent the coordinates of pixel i; the means, i.e. $\mu_x, \mu_y$, and standard deviations, i.e. $\sigma_x, \sigma_y$, are calculated with a Gaussian filter, $G_g$, with zero mean and a standard deviation $\sigma_g$; M is the number of levels; and $\alpha, \beta$ are the weights to adjust the contribution of each component.

Figure 6:
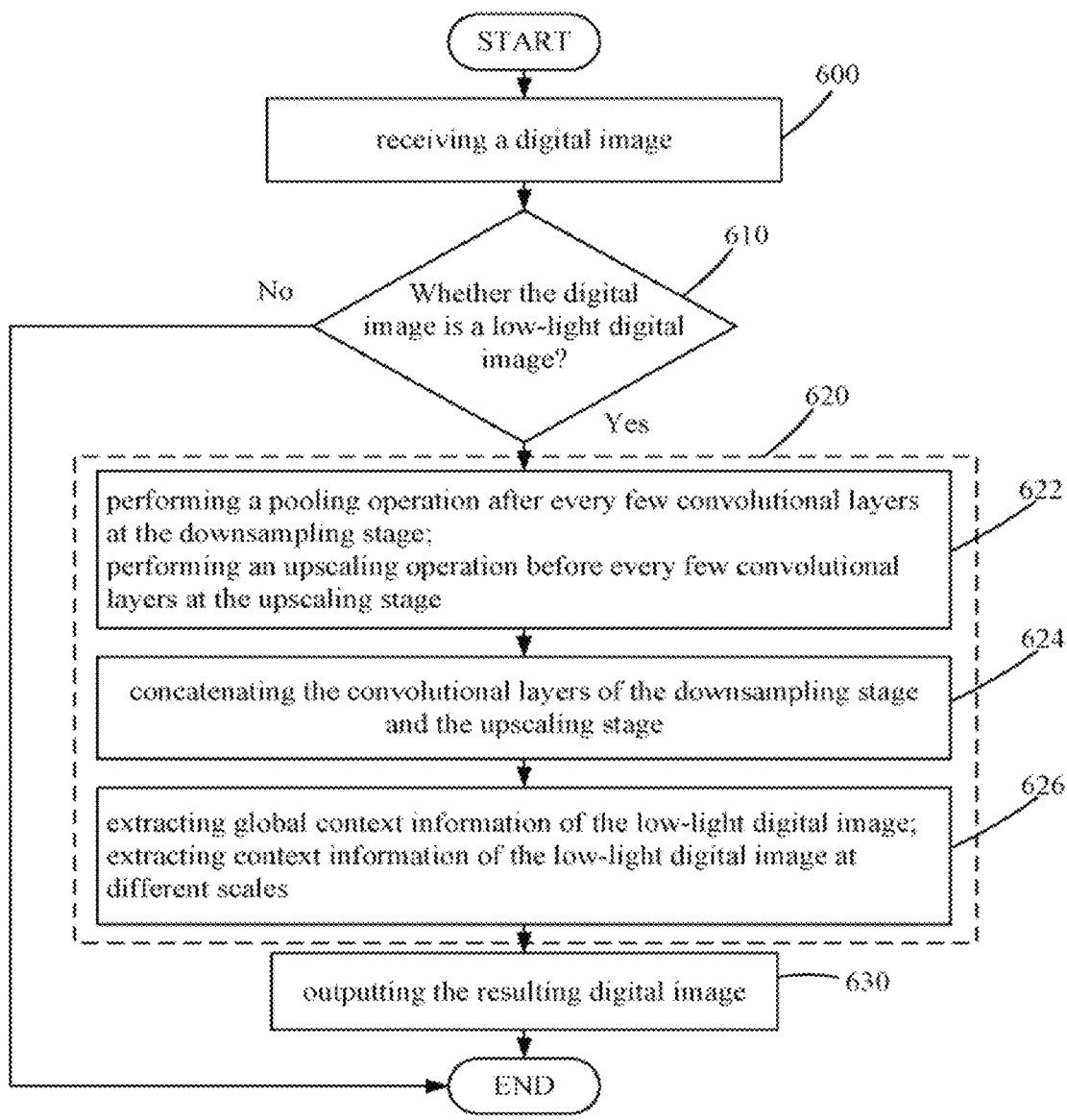
FIG. 6 is a flowchart illustrating a method for improving quality of low-light images in accordance with an embodiment of the present disclosure.

FIG. 6 is a flowchart illustrating a method for improving quality of low-light images in accordance with an embodiment of the present disclosure. Referring to FIGS. 1 to 6, the method includes the following blocks.

In block 600, the processor module 120 receives a digital image. Preferably, the digital image may be received from the camera device 110 of the terminal 100. In other conditions, the digital image may be transmitted from an external image capturing apparatus, or obtained via wired or wireless communication, or read from an internal or external storage.

In block 610, the low-light image determining module 204 determines whether the digital image captured by the camera device 110 is a low-light digital image. If any one or any combination of the contrast value, the dynamic range, and the SNR of the digital image is lower than a threshold, the digital image is determined to be the low-light digital image, and go to block 620 to use the encoder-decoder neural network 300 to process the low-light digital image with image denoising and enhancement. If no, the process is terminated.

In block 620, the encoder-decoder neural network 300 includes a plurality of convolutional layers 302 classified into a downsampling stage and an upscaling stage, and a multi-scale context aggregating block 350 configured to aggregate multi-scale context information of the low-light digital image and employed between the downsampling stage and the upscaling stage. The encoder-decoder neural network 300 comprises a U-net architecture.

In block 622, in the U-net architecture, a pooling operation is performed after every few convolutional layers 302 at the downsampling stage and an upscaling operation is performed before every few convolutional layers 302 at the upscaling stage.

In block 624, in the U-net architecture, the convolutional layers 302 of the downsampling stage and the convolutional layers 302 of the upscaling stage having a (substantially) same resolution (or at substantially same downsampling and upscaling level) with the convolutional layers 302 of the downsampling stage are concatenated. The concatenation means feature maps are combined by means of copy and crop operations as needed.

In block 626, multi-scale context aggregating block 350 includes the global pooling layer 352, the dilation layers 354, and the full-connected layer 358. The global pooling layer 352 extracts global context/color information of the low-light digital image; and the dilation layers 354 with various dilation rates extract local context/color information of the low-light digital image at different scales. The global pooling layer 352 and one of the dilation layers 354 are concatenated, and the other dilation layers 354 are concatenated in a cascading fashion with respect to corresponding scales. The full-connected layer 358 is connected after the global pooling layer 352 and the dilation layers 354 to generate a final representation containing multi-scale information of the low-light digital image. A bilinear upscaling operation may be performed to the global pooling layer 352 to rescale the size of the feature map in the global pooling layer 352 to a size as (substantially) the same as the input feature map.

Other details of the encoder-decoder neural network 300 are referred to related descriptions in above context, and are not repeated herein.

In block 630, the encoder-decoder neural network 300 outputs a resulting digital image and the processor module 120 outputs the resulting digital image to the output device 140 such as a display device, a storage, and a wired or wireless communication device.

Other details of the method for improving quality of low-light images are referred to related descriptions in above context, and are not repeated herein.

In the present disclosure, the low-light digital image is processed using the encoder-decoder neural network. The network includes the convolutional layers classified into the downsampling stage and the upscaling stage, and the multi-scale context aggregating block configured to aggregate multi-scale context information of the low-light digital image and employed between the downsampling stage and the upscaling stage. In comparison to existing arts, the present disclosure takes local and global context/color information of the low-light digital image into consideration. Accordingly, the noise can be exhaustively removed and the image can be greatly enhanced for better representation with fruitful details and vivid colors.

A person having ordinary skill in the art understands that each of the units, modules, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and module in the above-mentioned embodiment since the working processes of the above-mentioned system, device, and module are basically the same. For easy description and simplicity, these working processes will not be detailed.

It is understood that the disclosed system, device, and method in the embodiments of the present disclosure can be realized with other ways. The above-mentioned embodiments are exemplary only. The division of the modules is merely based on logical functions while other divisions exist in realization. It is possible that a plurality of modules or components are combined or integrated in another system. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules for display are or are not physical modules, that is, located in one place or distributed on a plurality of network modules. Some or all of the modules are used according to the purposes of the embodiments.

Moreover, each of the functional modules in each of the embodiments can be integrated in one processing module, physically independent, or integrated in one processing module with two or more than two modules.

If the software function module is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method, comprising:
   receiving a low-light digital image;
   generating, by at least one processor, a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and
   outputting, by the at least one processor, the resulting digital image to an output device.

2. The method according to claim 1, wherein before the receiving the low-light digital image, the method further comprises:
   receiving a digital image;
   determining whether at least one of a contrast value, a dynamic range, and a signal-to-noise ratio (SNR) of the digital image is lower than a threshold; and
   determining that the digital image is the low-light digital image in response to determine that at least one of the contrast value, the dynamic range, and the SNR is lower than the threshold.

3. The method according to claim 1, wherein the encoder-decoder neural network comprises a U-net architecture.

4. The method according to claim 1, wherein the generating the resulting digital image comprises:
   performing a pooling operation after every two convolutional layers at the downsampling stage; and
   performing an upscaling operation before every two convolutional layers at the upscaling stage.

5. The method according to claim 1, wherein the generating the resulting digital image comprises:
   concatenating the convolutional layers of the downsampling stage and the convolutional layers of the upscaling stage having a same resolution with the convolutional layers of the downsampling stage.

6. The method according to claim 1, wherein the generating the resulting digital image comprises:
   extracting, by a global pooling layer of the multi-scale context aggregating block, global context information of the low-light digital image; and
   extracting, by a plurality of dilation layers with various dilation rates of the multi-scale context aggregation block, context information of the low-light digital image at different scales.

7. The method according to claim 6, wherein the global pooling layer and one of the dilation layers are concatenated, and the other dilation layers are concatenated in a cascading fashion with respect to corresponding scales.

8. The method according to claim 6, wherein the generating the resulting digital image further comprises:
   performing a bilinear upscaling operation to the global pooling layer.

9. The method according to claim 6, wherein the multi-scale context aggregating block comprises:
   a full-connected layer connected after the global pooling layer and the dilation layers.

10. The method according to claim 1, wherein the outputting the resulting digital image comprises:
    outputting the resulting digital image to a display device to display the resulting digital image on the display device.

11. A system, comprising:
    at least one memory configured to store program instructions;

at least one processor configured to execute the program instructions, which cause the at least one processor to perform steps comprising:

receiving a low-light digital image;

generating a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and outputting the resulting digital image to an output device.

12. The system according to claim 11, wherein before the receiving the low-light digital image, the program instructions cause the at least one processor to:

receive a digital image;

determine whether at least one of a contrast value, a dynamic range, and a signal-to-noise ratio (SNR) of the digital image is lower than a threshold; and determine that the digital image is the low-light digital image in response to determine that at least one of the contrast value, the dynamic range, and the SNR is lower than the threshold.

13. The system according to claim 11, wherein the encoder-decoder neural network comprises a U-net architecture; and wherein the generating the resulting digital image comprises:

performing a pooling operation after every two convolutional layers at the downsampling stage;

performing an upscaling operation before every two convolutional layers at the upscaling stage; and concatenating the convolutional layers of the downsampling stage and the convolutional layers of the upscaling stage having a same resolution with the convolutional layers of the downsampling stage.

14. The system according to claim 11, wherein the generating the resulting digital image comprises:

extracting, by a global pooling layer of the multi-scale context aggregating block, global context information of the low-light digital image;

extracting, by a plurality of dilation layers with various dilation rates of the multi-scale context aggregation block, context information of the low-light digital image at different scales; and wherein the global pooling layer and one of the dilation layers are concatenated, and the other dilation layers are concatenated in a cascading fashion with respect to corresponding scales, and a full-connected layer of the multi-scale context aggregating block is connected after the global pooling layer and the dilation layers.

15. The system according to claim 14, wherein the generating the resulting digital image further comprises:

performing a bilinear upscaling operation to the global pooling layer.

16. A non-transitory computer-readable medium with program instructions stored thereon, that when executed by at least one processor, cause the at least one processor to perform steps comprising:

receiving a low-light digital image;

generating a resulting digital image by processing the low-light digital image with an encoder-decoder neural network comprising a plurality of convolutional layers classified into a downsampling stage and an upscaling stage, and a multi-scale context aggregating block configured to aggregate multi-scale context information of the low-light digital image and employed between the downsampling stage and the upscaling stage; and outputting the resulting digital image to an output device.

17. The non-transitory computer-readable medium according to claim 16, wherein before the receiving the low-light digital image, the program instructions cause the at least one processor to:

receive a digital image;

determine whether at least one of a contrast value, a dynamic range, and a signal-to-noise ratio (SNR) of the digital image is lower than a threshold; and determine that the digital image is the low-light digital image in response to determine that at least one of the contrast value, the dynamic range, and the SNR is lower than the threshold.

18. The non-transitory computer-readable medium according to claim 16, wherein the encoder-decoder neural network comprises a U-net architecture; and wherein the generating the resulting digital image comprises:

performing a pooling operation after every two convolutional layers at the downsampling stage;

performing an upscaling operation before every two convolutional layers at the upscaling stage; and concatenating the convolutional layers of the downsampling stage and the convolutional layers of the upscaling stage having a same resolution with the convolutional layers of the downsampling stage.

19. The non-transitory computer-readable medium according to claim 16, wherein the generating the resulting digital image comprises:

extracting, by a global pooling layer of the multi-scale context aggregating block, global context information of the low-light digital image;

extracting, by a plurality of dilation layers with various dilation rates of the multi-scale context aggregation block, context information of the low-light digital image at different scales; and wherein the global pooling layer and one of the dilation layers are concatenated, and the other dilation layers are concatenated in a cascading fashion with respect to corresponding scales, and a full-connected layer of the multi-scale context aggregating block is connected after the global pooling layer and the dilation layers.

20. The non-transitory computer-readable medium according to claim 19, wherein the generating the resulting digital image further comprises:

performing a bilinear upscaling operation to the global pooling layer.

* * * * *